United States Patent
Chou

(10) Patent No.: US 10,718,924 B2
(45) Date of Patent: Jul. 21, 2020

(54) LENS MODULE WITH AUTO-FOCUSING MECHANISM AND ELECTRONIC DEVICE

(71) Applicant: LARGAN PRECISION CO., LTD., Taichung (TW)

(72) Inventor: Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 14/838,536

(22) Filed: Aug. 28, 2015

(65) Prior Publication Data
US 2017/0023764 A1    Jan. 26, 2017

(30) Foreign Application Priority Data

Jul. 20, 2015  (TW) .............................. 104211651 U

(51) Int. Cl.
| | | |
|---|---|---|
| *G02B 7/02* | (2006.01) | |
| *G02B 15/14* | (2006.01) | |
| *G02B 7/09* | (2006.01) | |
| *G02B 13/00* | (2006.01) | |

(52) U.S. Cl.
CPC .............. *G02B 7/09* (2013.01); *G02B 7/021* (2013.01); *G02B 13/001* (2013.01)

(58) Field of Classification Search
CPC ......... G02B 7/09; G02B 7/021; G02B 13/001
USPC .................................................. 359/811–824
See application file for complete search history.

(56) References Cited

U.S. PATENT DOCUMENTS

| 7,419,315 B2 | 9/2008 | Hirata et al. | |
|---|---|---|---|
| 9,019,637 B2 | 4/2015 | Tsai | |
| 9,063,275 B2 | 6/2015 | Park | |
| 9,071,123 B2 | 6/2015 | Chou | |
| 2006/0018041 A1* | 1/2006 | Hirata | G02B 27/0018 |
| | | | 359/738 |
| 2007/0110424 A1* | 5/2007 | Iijima | G02B 7/026 |
| | | | 396/133 |
| 2007/0171554 A1* | 7/2007 | Yoshii | G02B 7/102 |
| | | | 359/819 |
| 2008/0037143 A1* | 2/2008 | Yoon | G02B 7/08 |
| | | | 359/824 |
| 2013/0155311 A1* | 6/2013 | Grandin | H04N 5/2257 |
| | | | 348/335 |
| 2013/0176634 A1* | 7/2013 | Dinesen | G03B 3/10 |
| | | | 359/814 |

(Continued)

*Primary Examiner* — Dawayne Pinkney
(74) *Attorney, Agent, or Firm* — McClure, Qualey & Rodack, LLP

(57) ABSTRACT

A lens module with auto-focusing mechanism includes a plastic lens barrel, a lens assembly, an auto-focusing mechanism and a coil regulating structure. The plastic lens barrel includes a front end portion, a rear end portion and an outer side portion, wherein the front end portion includes a front end surface and a front end hole, the rear end portion includes a rear end opening, the outer side portion connects the front end portion and the rear end portion. The lens assembly is disposed in the plastic lens barrel, and includes a plurality of lens elements. The auto-focusing mechanism is connected to the plastic lens barrel, and includes a coil being polygon. The coil regulating structure is located on the outer side portion of the plastic lens barrel, and is integrated with the plastic lens barrel, wherein the coil is connected and positioned to the coil regulating structure.

16 Claims, 11 Drawing Sheets

(56) References Cited

U.S. PATENT DOCUMENTS

| | | | | |
|---|---|---|---|---|
| 2013/0194490 A1* | 8/2013 | Okuyama | ................ | G02B 7/08 |
| | | | | 348/374 |
| 2014/0133040 A1* | 5/2014 | Tsai | ........................ | G02B 7/02 |
| | | | | 359/819 |
| 2015/0146313 A1 | 5/2015 | Dinesen | | |

* cited by examiner

LENS MODULE WITH AUTO-FOCUSING MECHANISM AND ELECTRONIC DEVICE

RELATED APPLICATIONS

This application claims priority to Taiwan Application Serial Number 104211651, filed Jul. 20, 2015, which is herein incorporated by reference.

BACKGROUND

Technical Field

The present disclosure relates to a lens module with auto-focusing mechanism. More particularly, the present disclosure relates to a lens module with auto-focusing mechanism applicable to mobile terminals.

Description of Related Art

In general, the voice-coil motor (VCM) is applied to the optical lens for providing an auto-focusing, and the coil of voice-coil motor is generally assembled on the carrier. The conventional optical lens module provides the auto-focusing function by assembling the carrier with coil and the lens barrel of the optical lens.

However, the assembling of the carrier and the lens barrel usually affects the precision of the optical lens module.

SUMMARY

According to one aspect of the present disclosure, a lens module with auto-focusing mechanism includes a plastic lens barrel, a lens assembly, an auto-focusing mechanism and a coil regulating structure. The plastic lens barrel includes a front end portion, a rear end portion and an outer side portion, wherein the front end portion includes a front end surface and a front end hole, the rear end portion includes a rear end opening, the outer side portion connecting the front end portion and the rear end portion. The lens assembly is disposed in the plastic lens barrel, and includes a plurality of lens elements. The auto-focusing mechanism is connected to the plastic lens barrel, and includes a coil being polygon. The coil regulating structure is located on the outer side portion of the plastic lens barrel, and is integrated with the plastic lens barrel, wherein the coil is connected and positioned to the coil regulating structure.

According to another aspect of the present disclosure, an electronic device includes the lens module with auto-focusing mechanism according to the aforementioned aspect.

According to further another aspect of the present disclosure, a lens module with auto-focusing mechanism includes a plastic lens barrel, a lens assembly, at least four plane surfaces, at least four protruding structures, at least one elastic member and an auto-focusing mechanism. The plastic lens barrel includes a front end portion, a rear end portion and an outer side portion. The front end portion includes a front end surface and a front end hole. The rear end portion includes a rear end opening. The outer side portion connects the front end portion and the rear end portion. The lens assembly is disposed in the plastic lens barrel, and includes a plurality of lens elements. The plane surfaces are located on the outer side portion of the plastic lens barrel, are integrated with the plastic lens barrel, and parallel to an optical axis of the lens assembly. The protruding structures are located on the outer side portion of the plastic lens barrel and integrated with the plastic lens barrel, each of the protruding structures extends along a direction parallel to an optical axis of the lens assembly. The elastic member is connected to the protruding structures of the plastic lens barrel. The auto-focusing mechanism is connected to the plane surfaces of the plastic lens barrel.

According to yet another aspect of the present disclosure, an electronic device includes the lens module with auto-focusing mechanism according to the aforementioned aspect.

DETAILED DESCRIPTION

Figure 1:
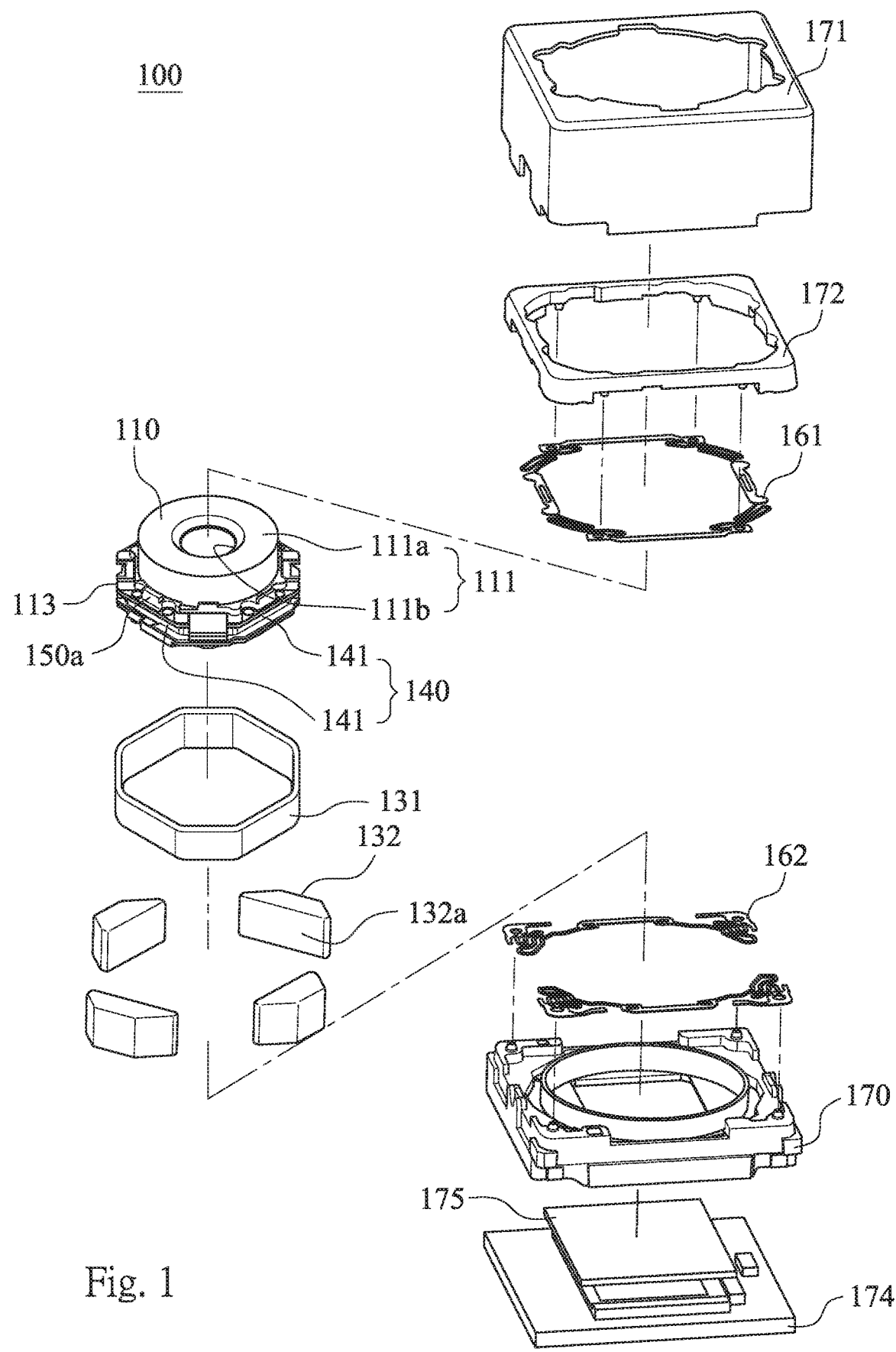
FIG. 1 is an exploded view of a lens module with auto-focusing mechanism according to the 1st embodiment of the present disclosure.
Figure 2:
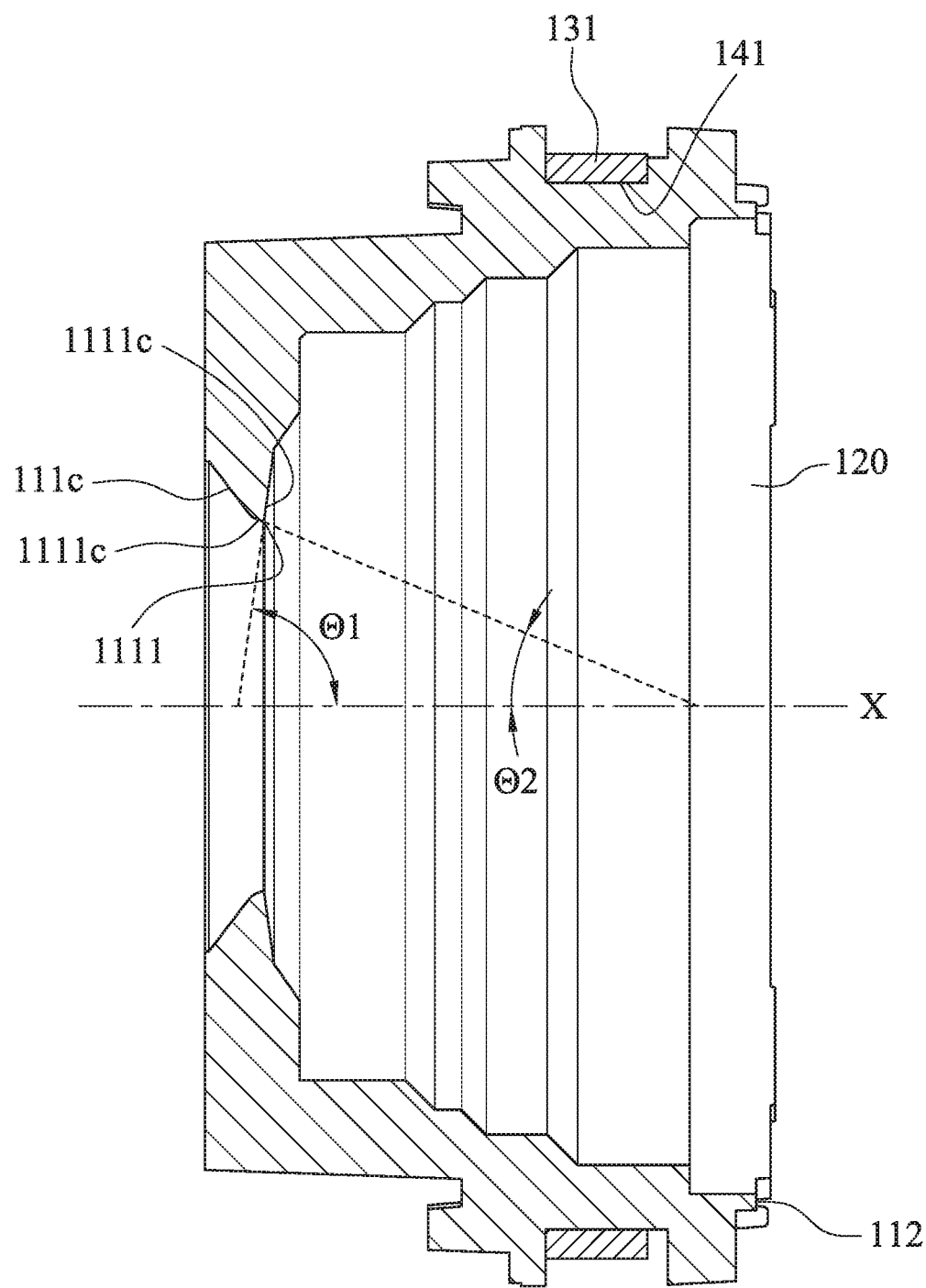
FIG. 2 is a sectional view of a plastic lens barrel and a lens assembly according to the 1st embodiment of FIG. 1.

FIG. 1 is an exploded view of a lens module with auto-focusing mechanism 100 according to the 1st embodiment of the present disclosure. FIG. 2 is a sectional view of a plastic lens barrel 110 and a lens assembly 120 according to the 1st embodiment of FIG. 1. In FIGS. 1 and 2, the lens module with auto-focusing mechanism 100 includes the plastic lens barrel 110, the lens assembly 120, an auto-focusing mechanism (its reference numeral is omitted) and a coil regulating structure 140. The lens assembly 120 is disposed in the plastic lens barrel 110, the auto-focusing mechanism is connected to the plastic lens barrel 110, and the coil regulating structure 140 is located on the outer side of the plastic lens barrel.

In detail, the plastic lens barrel 110 includes a front end portion 111, a rear end portion 112 and an outer side portion 113. The front end portion 111 includes a front end surface 111a and a front end hole 111b, wherein the front end hole 111b can be a stop, to be more specific, the front end hole 111b can be an aperture stop, so that the complexity of the mechanism design can be reduced. The rear end portion 112 includes a rear end opening (its reference numeral is omitted), and the outer side portion 113 connects the front end portion 111 and the rear end portion 112. The plastic lens barrel 110 can be made of injection molding method, and can be made of LCP (Liquid Crystal Polymer), PA (Poly-Amide) or PC (PolyCarbonate). Furthermore, the outer side portion 113 of the plastic lens barrel 110 can be a non-threaded structure, thus the convenience of assembling can be increased. Moreover, the front end portion 111 further includes a circular wall portion 111c, wherein the circular wall portion 111c surrounds the front end hole 111b and the circular wall portion 111c with two inclined portions 1111c, the two inclined portions 1111c are for forming a tip portion 1111, and an acute angle Θ1, Θ2 between each of the inclined portions 1111c and an optical axis X is greater than 0 degrees and smaller than 90 degrees.

The lens assembly 120 is disposed in the plastic lens barrel 110, and includes a plurality of lens elements. The lens assembly 120 has an optical axis X. When the lens assembly 120 is disposed in the plastic lens barrel 110, the central axis of the plastic lens barrel 110 can be aligned with the optical axis X, and the optical axis X represents as both of the optical axis of the lens assembly 120 and the central axis of the plastic lens barrel 110 hereafter.

The auto-focusing mechanism can be a voice-coil motor for providing the auto-focusing characteristic to the lens module, that is, the auto-focusing mechanism is for achieving the auto-focusing function by telescopically driving the plastic lens barrel 110 and the lens assembly 120. It is favorable for obtaining the compact size of the lens module with auto-focusing mechanism. The auto-focusing mechanism can include a coil 131 connected and surrounded the outer side portion 113 of the plastic lens barrel 110, wherein the coil 131 can be AF (Auto-focusing) coil.

The coil regulating structure 140 is located on the outer side portion 113 of the plastic lens barrel 110, and is integrated with the plastic lens barrel 110, thus the coil 131 is connected and positioned to the coil regulating structure 140. In detail, the coil regulating structure 140 includes at least four plane surfaces 141 parallel to the optical axis X, and are integrated with the plastic lens barrel 110. The coil 131 is polygon which is positioned on the plane surfaces 141. Therefore, the coil 131 can be assembled on the outer side portion 113 of the plastic lens barrel 110 stably for enhancing the assembling stability. Moreover, the plane surfaces 141 are equidistantly surrounded the optical axis X, so that the coil 131 can be surrounded the plastic lens barrel 110 equally and stably.

Figure 3:
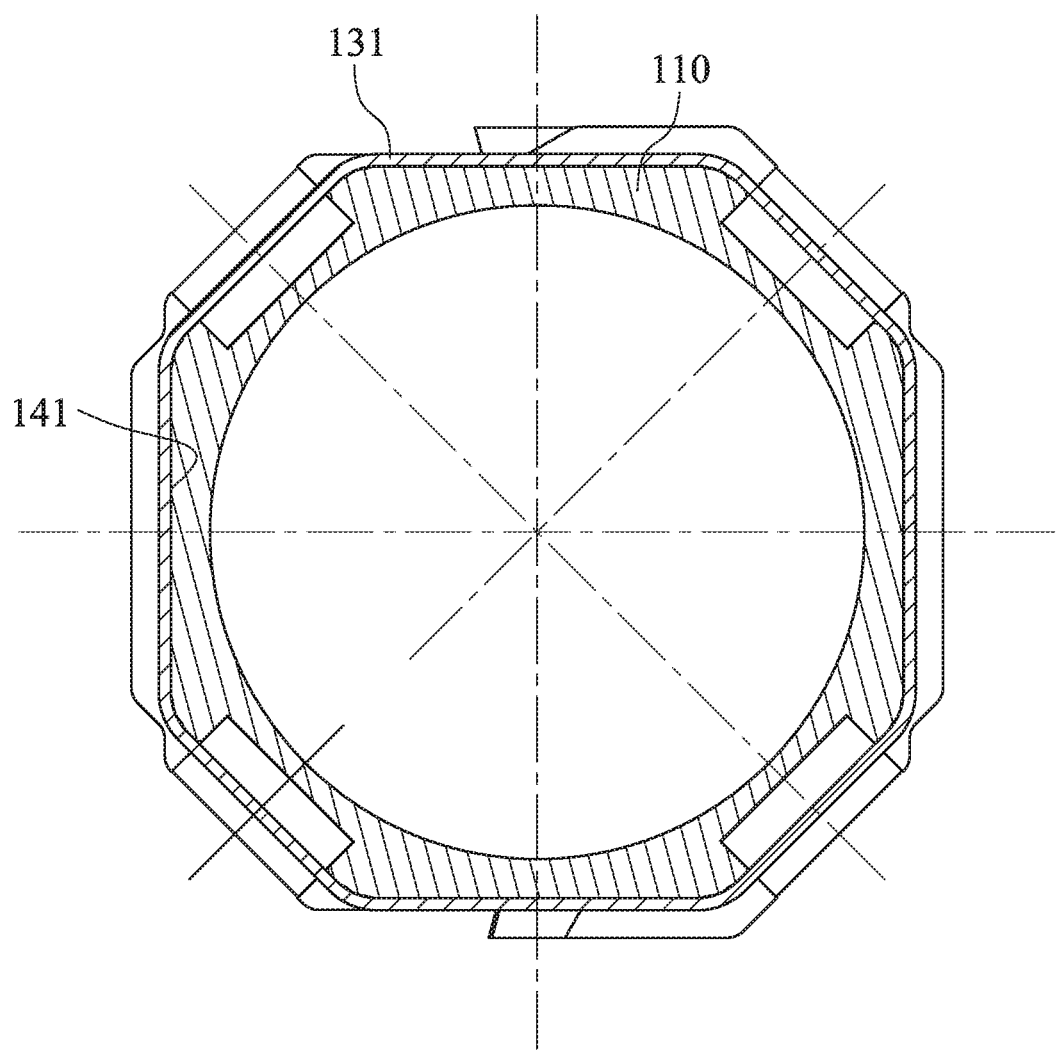
FIG. 3 is a sectional view of the plastic lens barrel and the coil according to the 1st embodiment of FIG. 1.

FIG. 3 is a sectional view of the plastic lens barrel 110 and the coil 131 according to the 1st embodiment of FIG. 1. According to the 1st embodiment of the present disclosure, the outer side portion 113 of the plastic lens barrel 110 includes four plane surfaces symmetrically located thereon, and the coil 131 is octagon, wherein four sides of the coil 131 which are symmetrical to each other are connected and positioned to the four plane surfaces 141 on the outer side portion 113 of the plastic lens barrel 110.

The lens module with auto-focusing mechanism 100 of the present disclosure can further include at least four protruding structures and at least one elastic member, wherein the protruding structures are located on the outer side portion 113 of the plastic lens barrel 110, and integrated with the plastic lens barrel 110, each of the protruding structures extends along a direction parallel to an optical axis X. The elastic member is connected to the protruding structures of the plastic lens barrel. Therefore, the complexity of the assembling process can be simplified, and the elastic member can be located in the lens module with auto-focusing mechanism stably. Preferably, the lens module with auto-focusing mechanism can include at least six protruding structures.

Figure 4A:
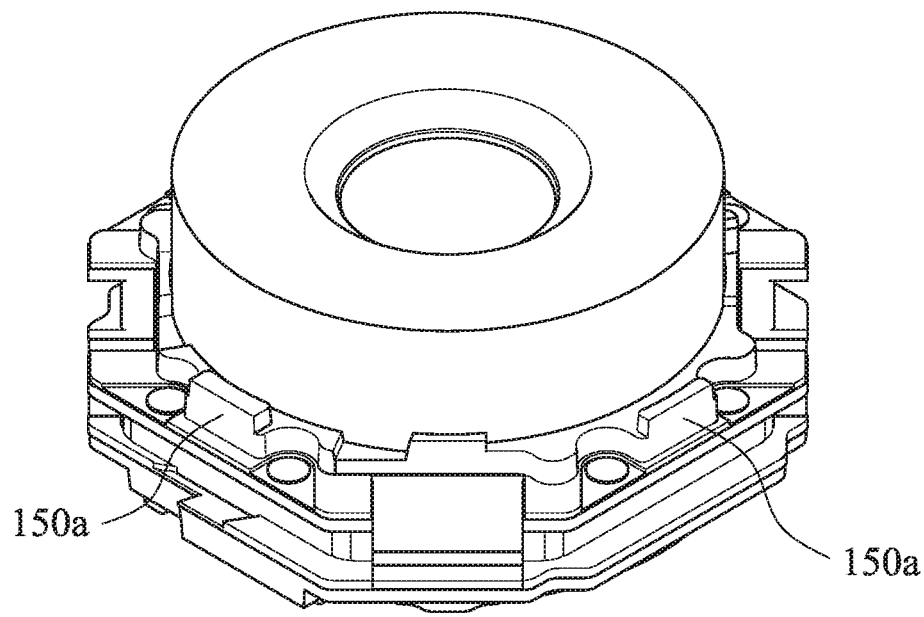
FIG. 4A is a three dimensional top view of the plastic lens barrel according to the 1st embodiment of FIG. 1.
Figure 4B:
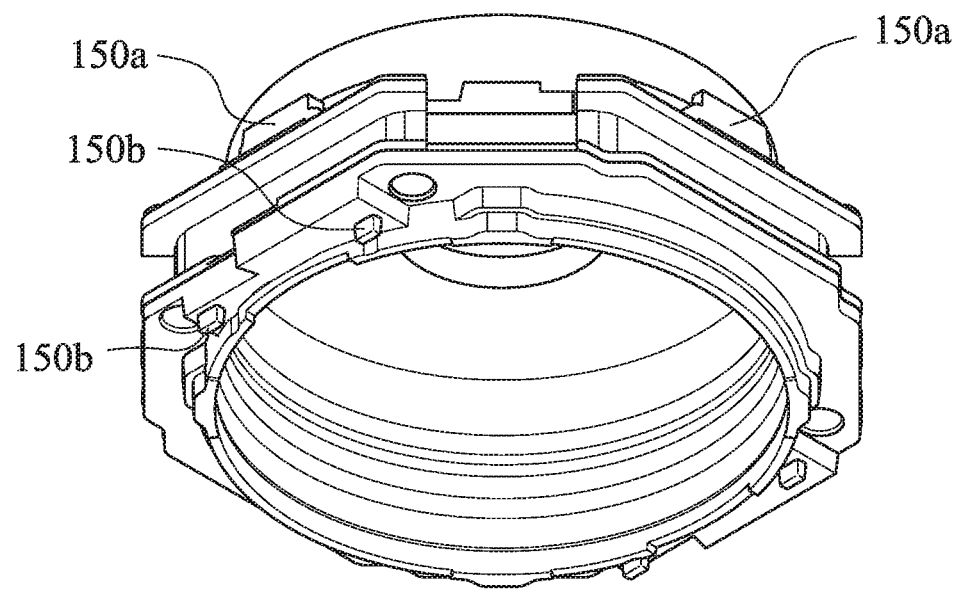
FIG. 4B is a three dimensional bottom view of the plastic lens barrel according to the 1st embodiment of FIG. 1.

FIG. 4A is a three dimensional top view of the plastic lens barrel 110 according to the 1st embodiment of FIG. 1. FIG. 4B is a three dimensional bottom view of the plastic lens barrel 110 according to the 1st embodiment of FIG. 1. In FIGS. 1, 4A and 4B, the elastic member of the lens module with auto-focusing mechanism 100 according to the 1st embodiment includes a first elastic member 161 and a second elastic member 162, and a number of the protruding structures is eight, which includes four first protruding structures 150a and four second protruding structures 150b. In detail, the first protruding structures 150a located on the outer side portion 113 of the plastic lens barrel 110 parallel to the direction parallel to the optical axis X, so that the first elastic member 161 can be disposed thereon. The four first protruding structures 150a are symmetrically located on the outer side portion 113, so that the first elastic member 161 can be connected uniformly, and the uniformity of the elastic supporting force provided by the first elastic member 161 will not be affected. The second protruding structures 150b are symmetrically located on the rear end portion 112 for connecting the second elastic member 162 uniformly, so that the uniformity of the elastic supporting force provided by the second elastic member 162 will not be affected.

Figure 5:
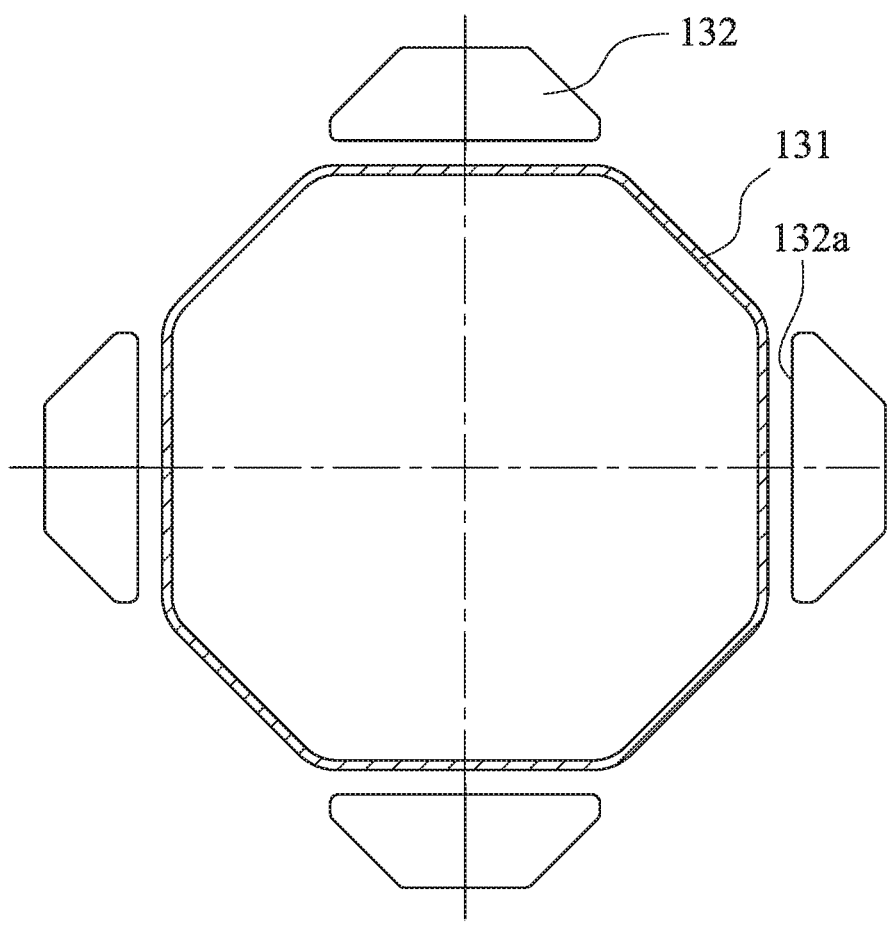
FIG. 5 is a schematic view of the coil and a field magnet assembly according to the 1st embodiment of FIG. 1.

FIG. 5 is a schematic view of the coil 131 and a field magnet assembly according to the 1st embodiment of FIG. 1. In FIGS. 1 and 5, the auto-focusing mechanism of the lens module with auto-focusing mechanism 100 can further include a field magnet assembly (its reference numeral is omitted) surrounded and adjacent to the coil 131. The field magnet assembly can include at least four field magnet units 132 symmetrically surrounded the coil 131. Each of the field magnet units 132 has an inner surface 132a, wherein the inner surface 132a of each of the field magnet units 132 is parallel and corresponds to each of the plane surfaces 141 of the coil regulating structure 140. When the coil 131 is surrounded on the outer side portion 113 of the plastic lens barrel 110 and connected to the plane surfaces 141 of the outer side portion 113, the inner surface 132a are symmetrically surrounded the coil 131, and parallel and adjacent to the coil 131. Therefore, the interaction between the field magnet units 132 and the coil 131 can be uniformed, and the telescopic movement of the lens module with auto-focusing mechanism can be further stable. Moreover, according to the 1st embodiment, the coil 131 is octagon, so that the electromagnetic actuated efficiency between the field magnet units 132 and the coil 131 can be enhanced.

In FIG. 1, generally, the lens module with auto-focusing mechanism can further include a holder 170, a cover 171, a spacer 172, a circuit board 174 and an imaging element 175. The plastic lens barrel 110, the lens assembly 120, the auto-focusing mechanism, the coil regulating structure 140, the protruding structures and the elastic member are located in the cover 171, and the holder 170 and the cover 171 are connected to each other, so that the lens module with auto-focusing mechanism 100 cab be applied to electronic devices, and will not be affected by the outer environment.

The spacer 172 is disposed on an inner side of the cover 171 and can be connected to other elements of the lens module with auto-focusing mechanism, so that it is favorable for arranging the elements in the cover 171. Furthermore, the first elastic member 161 can be connected to the spacer 172, so that the first elastic member 161 can be further stably disposed in the cover 171.

The holder 170 can further be connected to the circuit board 174, and the imaging element 175 can be disposed on the circuit board 174. The imaging element 175 is for receiving the imaging light from the lens assembly 120.

Figure 6A:
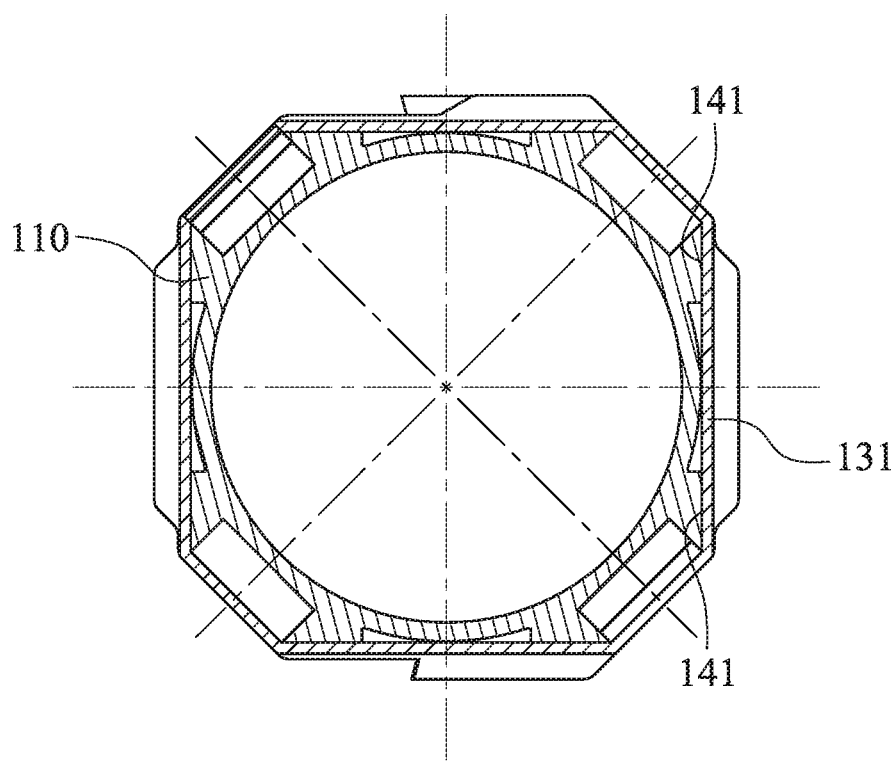
FIG. 6A is a sectional view of a plastic lens barrel and a coil of the lens module with auto-focusing mechanism according to the 2nd embodiment of the present disclosure.
Figure 6B:
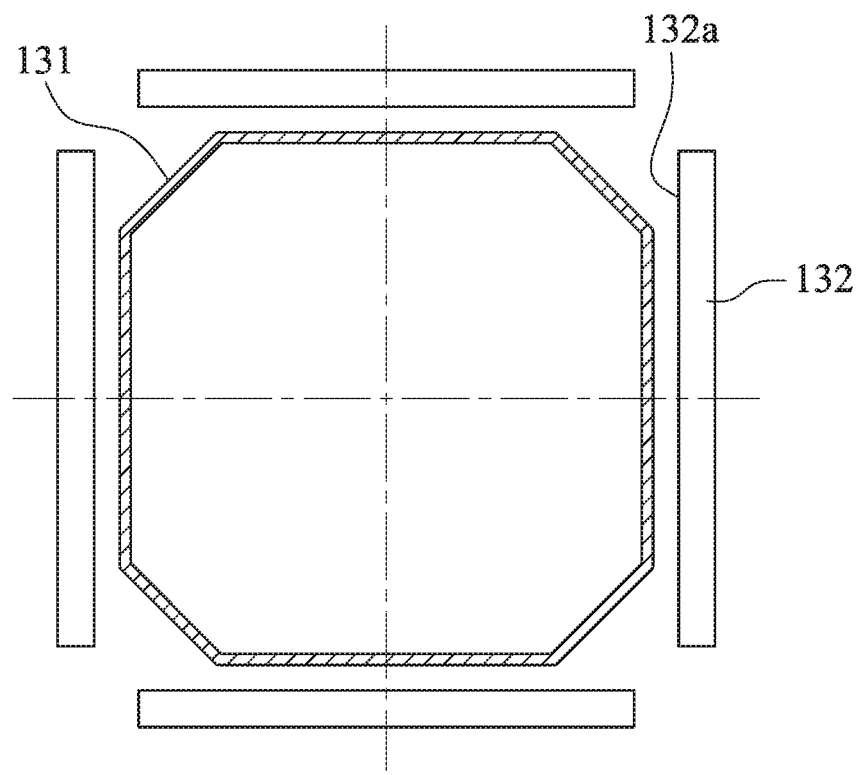
FIG. 6B is a schematic view of the coil and a field magnet assembly according to the 2nd embodiment of FIG. 6A.

FIG. 6A is a sectional view of a plastic lens barrel 110 and a coil 131 of the lens module with auto-focusing mechanism 100 according to the 2nd embodiment of the present disclosure. FIG. 6B is a schematic view of the coil 131 and a field magnet assembly according to the 2nd embodiment of FIG. 6A. In FIG. 6A, according to the 2nd embodiment, the plastic lens barrel 110 includes eight plane surfaces 141 symmetrically located on the outer side portion (its reference numeral is omitted in FIG. 6A) thereof, and the coil 131 is octagon, wherein the four sides of the coil 131 which are symmetrical to each other are connected and positioned to the eight plane surfaces 141 of the plastic lens barrel 110.

In FIG. 6B, according to the 2nd embodiment, the field magnet assembly (its reference numeral is omitted) includes four field magnet units 132 symmetrically surrounded the coil 131. Each of the field magnet units 132 has an inner surface 132a, wherein the inner surface 132a of each of the field magnet units 132 is parallel and corresponds to each of the plane surfaces 141 of the coil regulating structure. When the coil 131 is surrounded on the outer side portion of the plastic lens barrel 110 and connected to the plane surfaces 141 of the outer side portion, the inner surface 132a are symmetrically surrounded the coil 131, and parallel and adjacent to the coil 131.

Figure 7A:
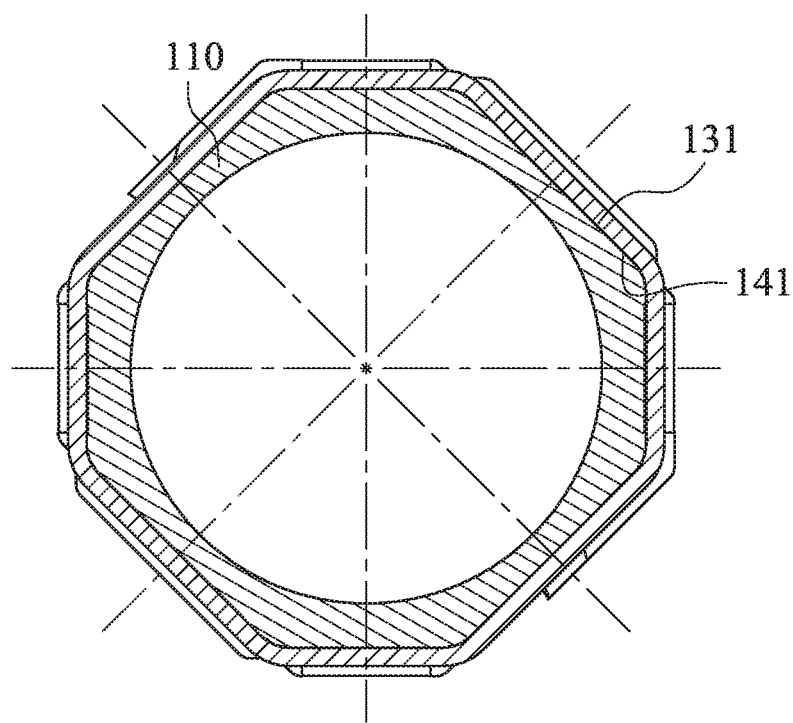
FIG. 7A is a sectional view of a plastic lens barrel and a coil of the lens module with auto-focusing mechanism according to the 3rd embodiment of the present disclosure.
Figure 7B:
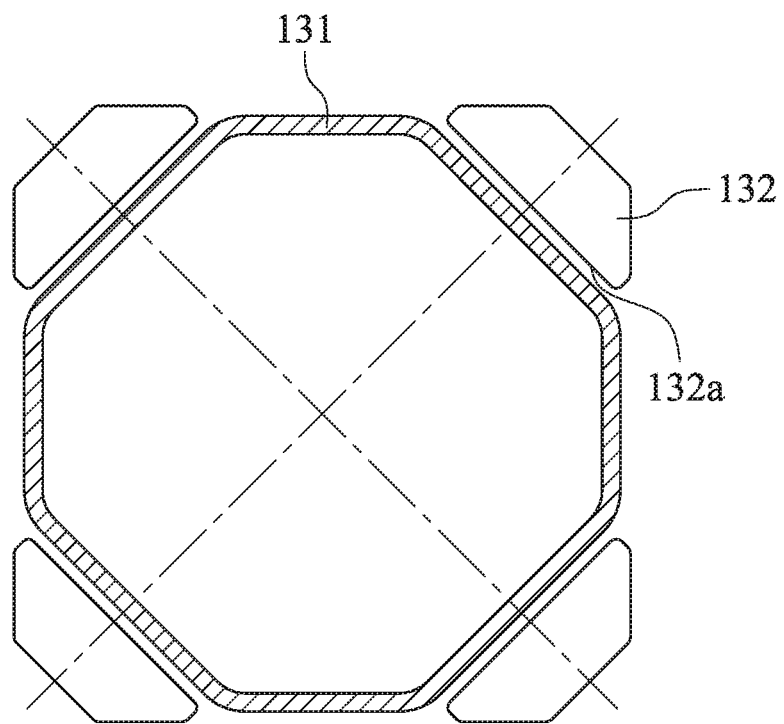
FIG. 7B is a schematic view of the coil and a field magnet assembly according to the 3rd embodiment of FIG. 7A.

FIG. 7A is a sectional view of a plastic lens barrel 110 and a coil 131 of the lens module with auto-focusing mechanism 100 according to the 3rd embodiment of the present disclosure. FIG. 7B is a schematic view of the coil 131 and a field magnet assembly according to the 3rd embodiment of FIG. 7A. In FIG. 7A, according to the 3rd embodiment, the plastic lens barrel 110 includes eight plane surfaces 141 symmetrically located on the outer side portion (its reference numeral is omitted in FIG. 7A) thereof, and the sectional view of the eight plane surfaces 141 is octagon. The coil 131 is octagon, and the sides of the coil 131 are connected and positioned to the eight plane surfaces 141 of the plastic lens barrel 110.

In FIG. 7B, according to the 3rd embodiment, the field magnet assembly (its reference numeral is omitted) includes four field magnet units 132 symmetrically surrounded the coil 131. Each of the field magnet units 132 has an inner surface 132a, wherein the inner surface 132a of each of the field magnet units 132 is parallel and corresponds to each of the plane surfaces 141 of the coil regulating structure. When the coil 131 is surrounded on the outer side portion of the plastic lens barrel 110 and connected to the plane surfaces 141 of the outer side portion, the inner surface 132a are symmetrically surrounded the coil 131, and parallel and adjacent to the coil 131.

Figure 8A:
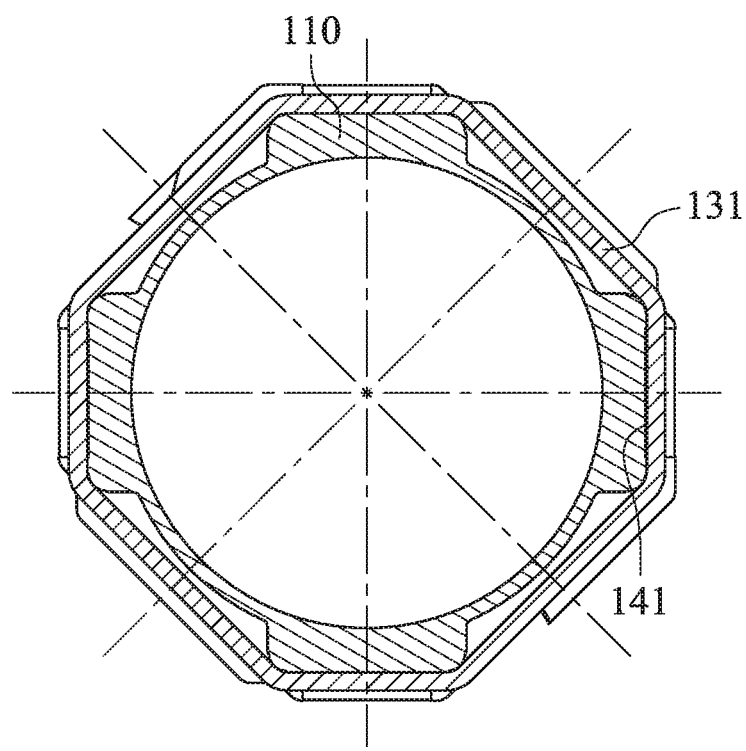
FIG. 8A is a sectional view of a plastic lens barrel and a coil of the lens module with auto-focusing mechanism according to the 4th embodiment of the present disclosure.
Figure 8B:
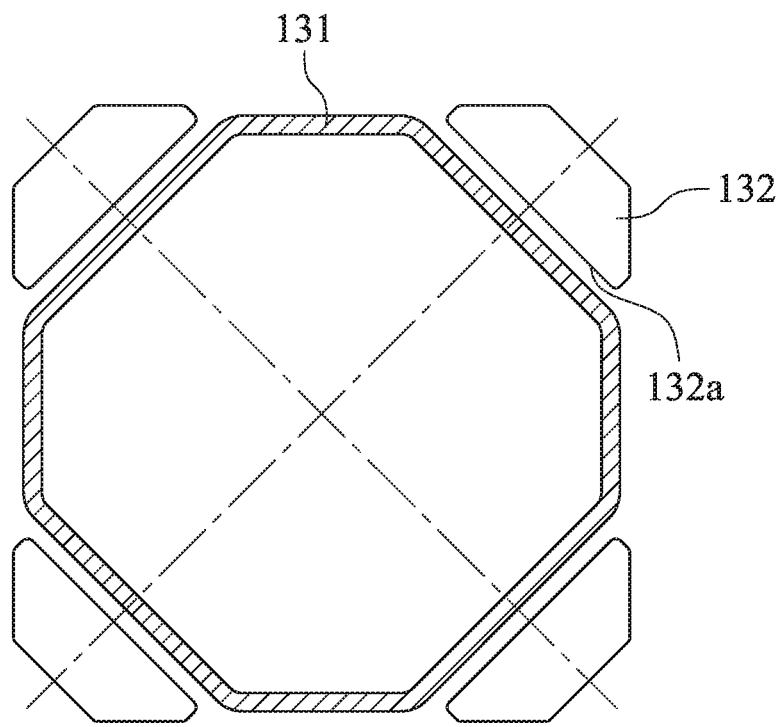
FIG. 8B is a schematic view of the coil and a field magnet assembly according to the 4th embodiment of FIG. 8A.

FIG. 8A is a sectional view of a plastic lens barrel 110 and a coil 131 of the lens module with auto-focusing mechanism 100 according to the 4th embodiment of the present disclosure. FIG. 8B is a schematic view of the coil 131 and a field magnet assembly according to the 4th embodiment of FIG. 8A. In FIG. 8A, according to the 4th embodiment, the plastic lens barrel 110 includes four plane surfaces 141 symmetrically located on the outer side portion (its reference numeral is omitted in FIG. 8A) thereof, the coil 131 is octagon, wherein the four sides of the coil 131 which are symmetrical to each other are connected and positioned to the four plane surfaces 141 of the plastic lens barrel 110.

In FIG. 8B, according to the 4th embodiment, the field magnet assembly (its reference numeral is omitted) includes four field magnet units 132 symmetrically surrounded the coil 131. Each of the field magnet units 132 has an inner surface 132a, wherein the inner surface 132a of each of the field magnet units 132 is parallel and corresponds to each of the plane surfaces 141 of the coil regulating structure. When the coil 131 is surrounded on the outer side portion of the plastic lens barrel 110 and connected to the plane surfaces 141 of the outer side portion, the inner surface 132a are symmetrically surrounded the coil 131, and parallel and adjacent to the coil 131.

Figure 9A:
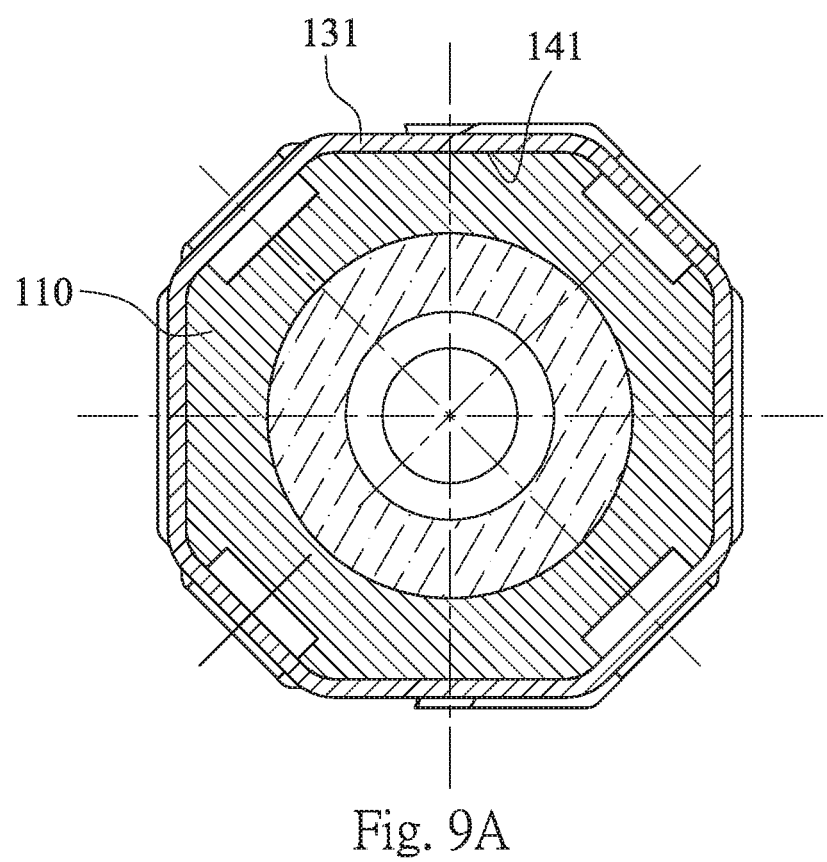
FIG. 9A is a sectional view of a plastic lens barrel and a coil of the lens module with auto-focusing mechanism according to the 5th embodiment of the present disclosure.
Figure 9B:
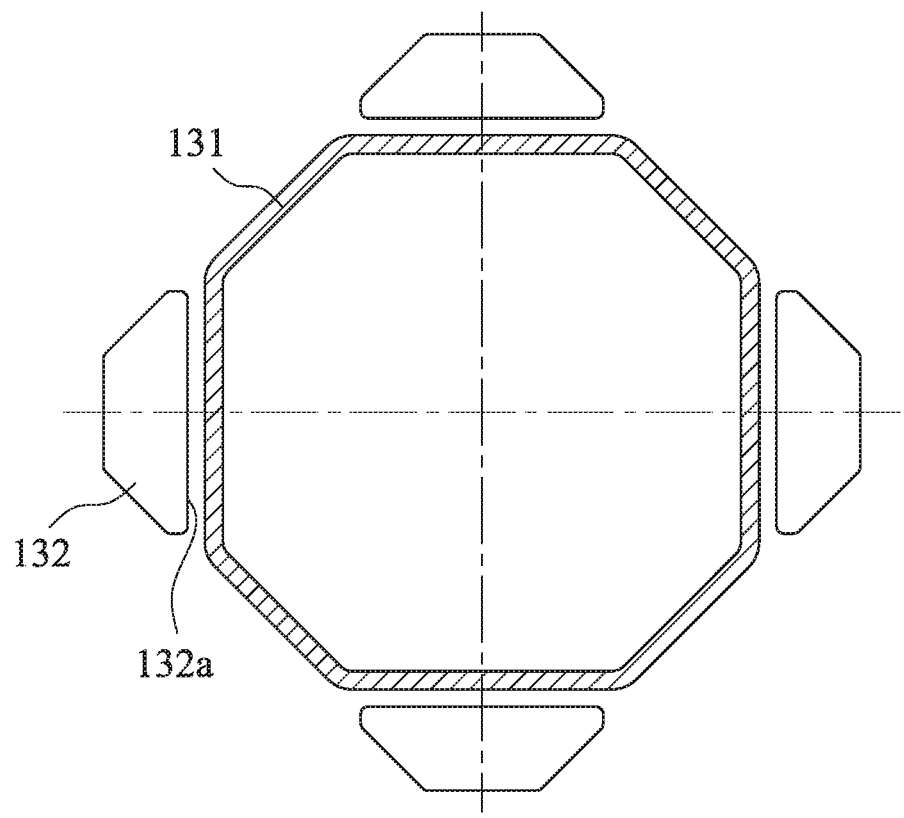
FIG. 9B is a schematic view of the coil and a field magnet assembly according to the 5th embodiment of FIG. 9A.

FIG. 9A is a sectional view of a plastic lens barrel 110 and a coil 131 of the lens module with auto-focusing mechanism 100 according to the 5th embodiment of the present disclosure. FIG. 9B is a schematic view of the coil 131 and a field magnet assembly according to the 5th embodiment of FIG. 9A. In FIG. 9A, according to the 5th embodiment, the plastic lens barrel 110 includes four plane surfaces 141 symmetrically located on the outer side portion (its reference numeral is omitted in FIG. 9A) thereof, the coil 131 is octagon, wherein the four sides of the coil 131 which are symmetrical to each other are connected and positioned to the four plane surfaces 141 of the plastic lens barrel 110.

In FIG. 9B, according to the 5th embodiment, the field magnet assembly (its reference numeral is omitted) includes four field magnet units 132 symmetrically surrounded the coil 131. Each of the field magnet units 132 has an inner surface 132a, wherein the inner surface 132a of each of the field magnet units 132 is parallel and corresponds to each of the plane surfaces 141 of the coil regulating structure. When the coil 131 is surrounded on the outer side portion of the plastic lens barrel 110 and connected to the plane surfaces 141 of the outer side portion, the inner surface 132a are symmetrically surrounded the coil 131, and parallel and adjacent to the coil 131.

Figure 9C:
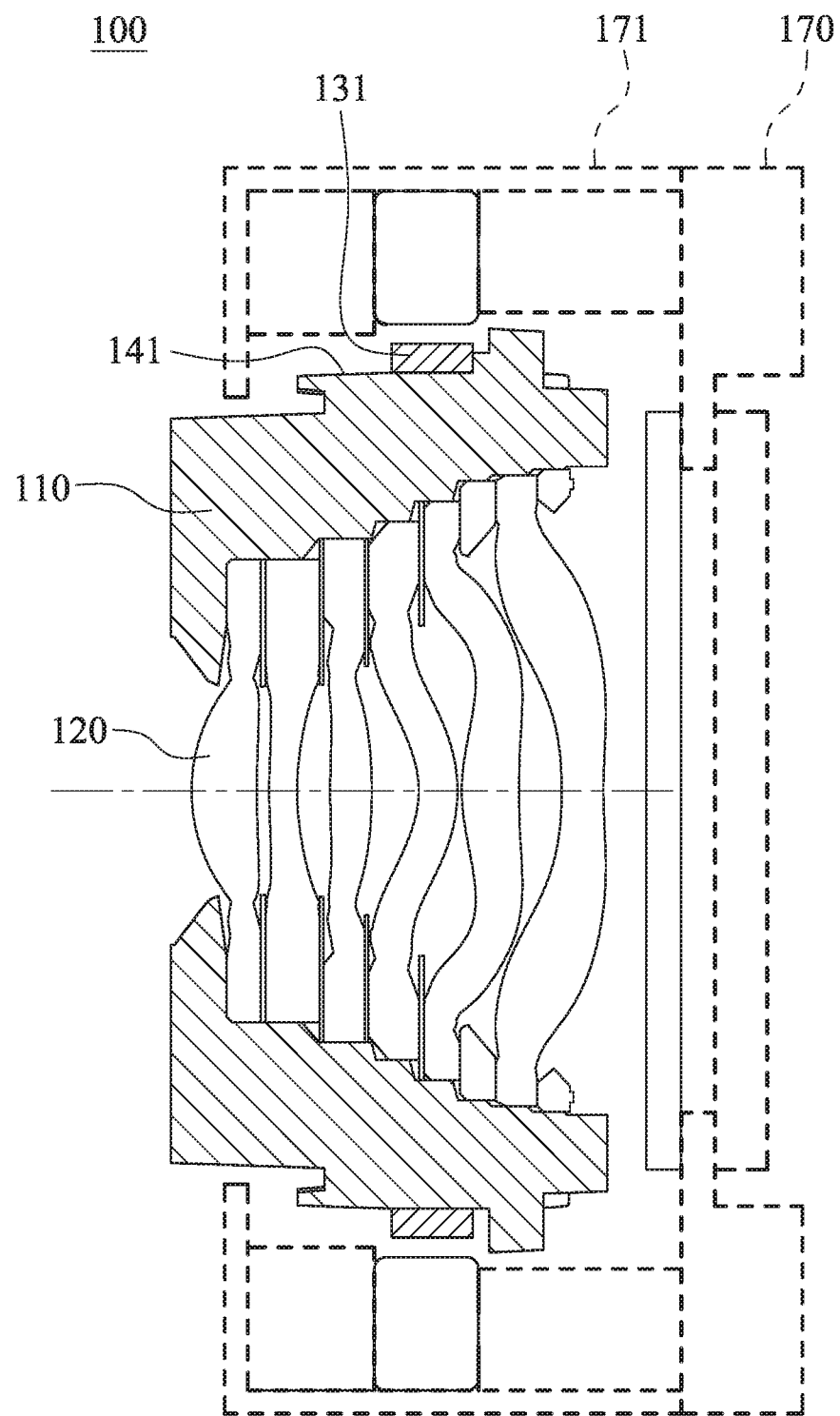
FIG. 9C is a sectional view of the lens module with auto-focusing mechanism according to the 5th embodiment of the present disclosure.

FIG. 9C is a sectional view of the lens module with auto-focusing mechanism 100 according to the 5th embodiment of the present disclosure. In FIG. 9C, the cover 171 is coupled to the holder 170, so that the elements, such as the plastic lens barrel 110, the lens assembly 120 and the coil 131 can be located therein. According to the 5th embodiment, the elements of the lens module with auto-focusing mechanism 100 are arranged as the 1st embodiment of FIG. 1, and will not described again herein.

Figure 10:
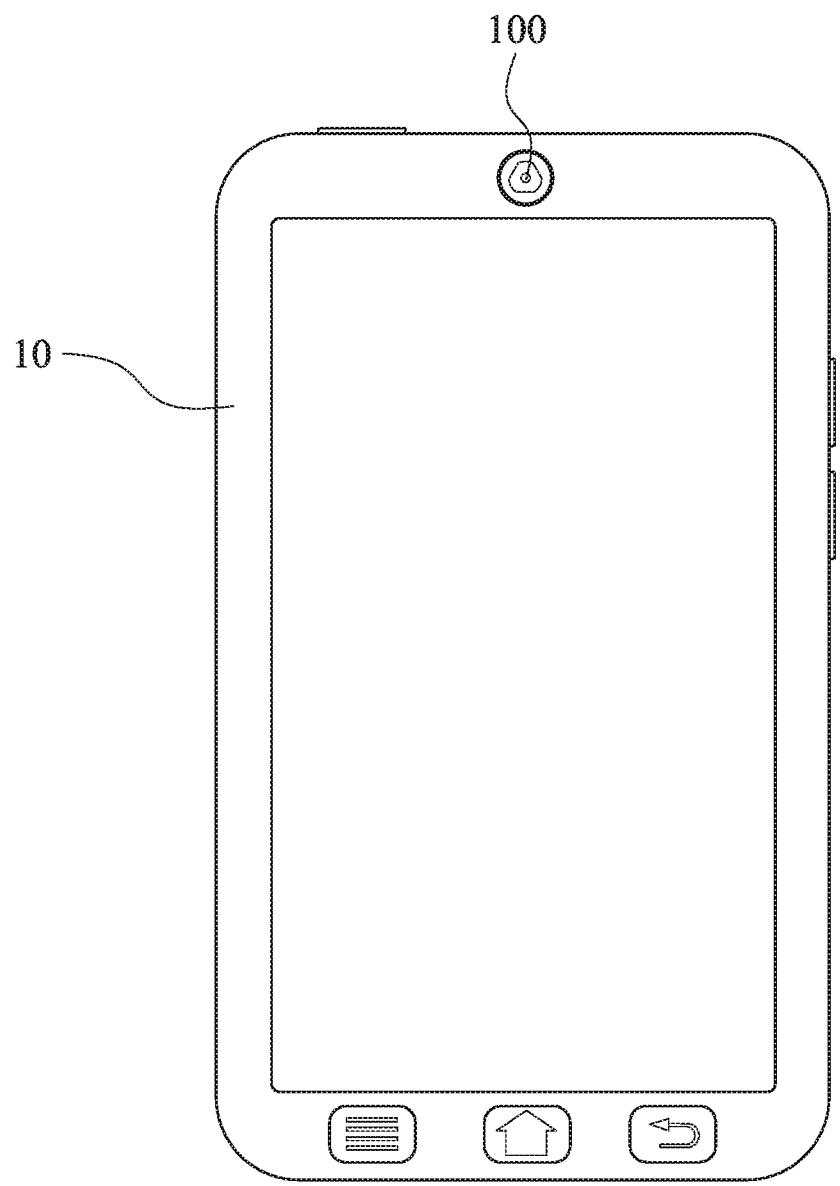
FIG. 10 is a schematic view of an electronic device according to the 6th embodiment of the present disclosure.

FIG. 10 is a schematic view of an electronic device 10 according to the 6th embodiment of the present disclosure. In FIG. 10, the electronic device 10 according to the 6th embodiment is a mobile phone, and the electronic device 10 includes a lens module with auto-focusing mechanism 100, wherein the lens module with auto-focusing mechanism 100 according to the 6th embodiment can be any one of the 1st to 5th embodiments in the foregoing description, and will not described again herein.

The foregoing description, for purpose of explanation, has been described with reference to specific embodiments. It is to be noted that the tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A lens module with auto-focusing mechanism, comprising:
    a plastic lens barrel comprising:
        a front end portion comprising a front end surface, a front end hole and a circular wall portion, wherein the circular wall portion surrounds the front end hole and the front end hole is an aperture stop, the circular wall portion with two inclined portions, the two inclined portions are for forming a tip portion, and an acute angle between each of the inclined portions and an optical axis is greater than 0 degrees and smaller than 90 degrees;
        a rear end portion comprising a rear end opening; and
        an outer side portion connecting the front end portion and the rear end portion;
        at least four protruding structures located on the outer side portion of the plastic lens barrel; and
        a coil regulating structure located on the outer side portion of the plastic lens barrel;
    a lens assembly disposed in the plastic lens barrel, and comprising a plurality of lens elements, wherein the lens elements are directly contained in the plastic lens barrel, and each of the lens elements is contacted with an inner side of the plastic lens barrel;
    at least one elastic member connected to the protruding structures of the plastic lens barrel;
    an auto-focusing mechanism connected to the plastic lens barrel, and comprising:
        a coil being polygon; and
    wherein the coil regulating structure is integrally formed with the plastic lens barrel, the coil is connected and positioned to the coil regulating structure, each of the protruding structures extending along a direction parallel to the optical axis of the lens assembly, and the plastic lens barrel is made of injection molding method;
    wherein the plastic lens barrel is a non-threaded structure;
    wherein the coil regulating structure is located on two sides of the coil along the direction parallel to the optical axis of the lens assembly, and the coil regulating structure is overlapped with the coil along the direction parallel to the optical axis from both of the two sides of the coil.

2. The lens module with auto-focusing mechanism of claim 1, wherein the auto-focusing mechanism is a voice-coil motor.

3. The lens module with auto-focusing mechanism of claim 2, wherein the coil regulating structure comprises:
    at least four plane surfaces parallel to an optical axis of the lens assembly.

4. The lens module with auto-focusing mechanism of claim 3, wherein the coil is positioned on the plane surfaces.

5. The lens module with auto-focusing mechanism of claim 3, wherein the auto-focusing mechanism further comprises:
    a field magnet assembly surrounded and adjacent to the coil.

6. The lens module with auto-focusing mechanism of claim 5, wherein the field magnet assembly comprises:
    at least four field magnet units symmetrically surrounded the coil, each of the field magnet units having an inner surface, wherein the inner surface of each of the field magnet units is parallel and corresponds to each of the plane surfaces of the coil regulating structure.

7. The lens module with auto-focusing mechanism of claim 2, wherein the coil is octagon.

8. An electronic device, comprising:
    the lens module with auto-focusing mechanism of claim 1.

9. A lens module with auto-focusing mechanism, comprising:
    a plastic lens barrel comprising:
        a front end portion comprising a front end surface, a front end hole and a circular wall portion, wherein the circular wall portion surrounds the front end hole and the front end hole is an aperture stop, the circular wall portion with two inclined portions, the two inclined portions are for forming a tip portion, and an acute angle between each of the inclined portions and an optical axis is greater than 0 degrees and smaller than 90 degrees;
        a rear end portion comprising a rear end opening;
        an outer side portion connecting the front end portion and the rear end portion;
        at least four plane surfaces located on the outer side portion of the plastic lens barrel; and
        at least four protruding structures located on the outer side portion of the plastic lens barrel;
    a lens assembly disposed in the plastic lens barrel, and comprising a plurality of lens elements, wherein the lens elements are directly contained in the plastic lens barrel, and each of the lens elements is contacted with an inner side of the plastic lens barrel;
    at least one elastic member connected to the protruding structures of the plastic lens barrel; and
    an auto-focusing mechanism connected to the plane surfaces of the plastic lens barrel;
    wherein the plane surfaces are integrally formed with the plastic lens barrel, and parallel to an optical axis of the lens assembly;
    wherein the protruding structures are integrally formed with the plastic lens barrel, each of the protruding structures extending along a direction parallel to the optical axis of the lens assembly, and the plastic lens barrel is made of injection molding method;
    wherein the plastic lens barrel is a non-threaded structure;
    wherein the plastic lens barrel further comprises a coil and a coil regulating structure, the coil regulating structure is located on two sides of the coil along the direction parallel to the optical axis of the lens assembly, and the coil regulating structure is overlapped with the coil along the direction parallel to the optical axis from both of the two sides of the coil, and the coil regulating structure comprises the four plane surfaces.

10. The lens module with auto-focusing mechanism of claim 9, wherein the plane surfaces are equidistantly surrounded the optical axis.

11. The lens module with auto-focusing mechanism of claim 9, wherein:
    the coil connected and positioned to the plane surfaces.

12. The lens module with auto-focusing mechanism of claim 11, wherein the coil is polygon.

13. The lens module with auto-focusing mechanism of claim 12, wherein the coil is octagon.

14. The lens module with auto-focusing mechanism of claim 13, wherein the auto-focusing mechanism further comprises:
    a field magnet assembly surrounded and adjacent to the coil, wherein the field magnet assembly comprises at least four field magnet units symmetrically surrounded the coil.

15. The lens module with auto-focusing mechanism of claim 9, wherein the lens module with auto-focusing mechanism comprises at least six protruding structures.

16. An electronic device, comprising:
   the lens module with auto-focusing mechanism of claim 9.

* * * * *